United States Patent [19]

Wixson et al.

[11] Patent Number: 5,847,755
[45] Date of Patent: Dec. 8, 1998

[54] METHOD AND APPARATUS FOR DETECTING OBJECT MOVEMENT WITHIN AN IMAGE SEQUENCE

[75] Inventors: Lambert Ernest Wixson, Princeton; Stephen Charles Hsu, East Windsor, both of N.J.

[73] Assignee: Sarnoff Corporation, Princeton, N.J.

[21] Appl. No.: 755,376

[22] Filed: Dec. 11, 1996

Related U.S. Application Data

[63] Continuation of Ser. No. 372,924, Jan. 17, 1995, abandoned.
[51] Int. Cl.[6] .................................................... H04N 7/18
[52] U.S. Cl. ........................................... 348/149; 348/155
[58] Field of Search .................................... 348/149, 155, 348/169, 148, 161, 143, 154, 699; 382/103, 104

[56] References Cited

U.S. PATENT DOCUMENTS

| | | | |
|---|---|---|---|
| 4,163,257 | 7/1979 | White | 358/133 |
| 4,187,519 | 2/1980 | Vitols et al. | 358/169 |
| 4,214,265 | 7/1980 | Olesen | 358/93 |
| 4,433,325 | 2/1984 | Tanaka et al. | 340/937 |
| 4,490,851 | 12/1984 | Gerhart et al. | 382/43 |
| 4,692,806 | 9/1987 | Anderson et al. | 358/209 |
| 4,839,648 | 6/1989 | Beucher et al. | 340/933 |
| 4,847,772 | 7/1989 | Michalopoulos et al. | 364/436 |
| 5,034,986 | 7/1991 | Karmann et al. | 382/1 |
| 5,099,324 | 3/1992 | Abe | 348/155 |
| 5,134,472 | 7/1992 | Abe | 348/155 |
| 5,161,107 | 11/1992 | Mayeaux et al. | 364/436 |
| 5,281,964 | 1/1994 | Iida et al. | 340/936 |
| 5,283,573 | 2/1994 | Takatou et al. | 340/937 |
| 5,313,295 | 5/1994 | Taniguchi et al. | 348/149 |
| 5,359,674 | 10/1994 | van der Wal | 382/41 |
| 5,406,501 | 4/1995 | Florent | 348/169 |
| 5,438,360 | 8/1995 | Edwards | 348/155 |
| 5,598,338 | 1/1997 | Taniguchi et al. | 348/149 |
| 5,757,286 | 3/1998 | Johnson et al. | 348/148 |
| 5,761,326 | 6/1998 | Brady et al. | 348/148 |

FOREIGN PATENT DOCUMENTS

WO9411852  5/1994  WIPO .

OTHER PUBLICATIONS

English Language Abstract of WO 94/11852.
Traitement du Signal, vol. 9., No. 4, 1992, Maciej Orkisz: "Localisation d'Objects Mobiles Dans des Scenes Naturelles Filmees par une Camera Fixe".
Two–Dimensional Vehicle Tracking using Video–Image Processing, Sep. 2, 1992, Yamamoto, Kuwahara and Misra (Presented at the 3rd Vehicle Navigation & Information Systems Conference, Oslo, Norway,Sep. 2–4, 1992.
International Search Report from corresponding PCT application PCT/US96/00022, mailed Jun. 11, 1996.
Hierarchical Model–Based Motion Estimation, Mar. 23, 1992, James R. Bergen et al.,(appearing in Proc. of European Conference on Computer Vision—92).

*Primary Examiner*—Tommy P. Chin
*Assistant Examiner*—Gims S. Philippe
*Attorney, Agent, or Firm*—William J. Burke

[57] ABSTRACT

Method and apparatus for processing a sequence of images to detect object movement within the sequence. Specifically, the method comprises the steps of: (a) supplying a sequence of image frames; (b) initializing a reference image that contains image information regarding stationary objects within a scene represented by the sequence of images; (c) supplying a next image frame which temporally follows the sequence of image frames; (d) comparing the next image to the reference image to produce a motion image representing motion information regarding movement of objects within the scene; (e) updating the reference image with information within the next image that represents stationary objects within the scene; and (f) repeating steps (c), (d), and (e) for each next image supplied. The method is implemented by image processing apparatus. A specific embodiment of the method and apparatus is a traffic monitoring system that identifies vehicles in varying illumination levels and eliminates erroneous identification of non-physical movement in the scene such as shadows and headlight reflections.

40 Claims, 6 Drawing Sheets

METHOD AND APPARATUS FOR DETECTING OBJECT MOVEMENT WITHIN AN IMAGE SEQUENCE

This is a continuation of application Ser. No. 08/372,924 filed on Jan. 17, 1995 abandoned.

BACKGROUND OF THE INVENTION

1. Field of the Invention

The invention relates to a vehicular traffic monitoring system and, more particularly, to such a system that digitally processes pixels of successive image frames derived from a video camera viewing road traffic.

2. Description of the Prior Art

Various types of traffic monitoring systems are known in the prior art and examples thereof are respectively disclosed in U.S. Pat. Nos. 4,433,325, 4,847,772, 5,161,107 and 5,313,295. However, there is a need for a more robust traffic monitoring system that is computationally efficient and yet is relatively inexpensive to implement.

Further, the present invention makes use of pyramid teachings disclosed in U.S. Pat. No. 4,692,806, which issued to Anderson et al. on September 8, and image flow teachings disclosed in the article "Hierarchical Model-Based Motion Estimation" by Bergen et al., appearing in the *Proceedings of the European Conference on Computer Vision,* Springer-Verlag, 1992. Both of these teachings are incorporated herein by reference.

SUMMARY OF THE INVENTION

The invention relates to an improvement in digital image processing means of a vehicular traffic monitoring system that includes a video camera having a given field of view for recording successive image frames of road traffic within its field of view. The digital image processing means, is responsive to pixel information defined by each of the successive image frames.

Specifically, the digital image processing means comprises first means responsive to an initial train of the successive image frames for deriving a stored initial reference image defining only stationary objects within the field of view and thereafter updating the stored initial reference image with a reference image derived from an image frame recorded later than the initial train, with each pixel's digital amplitude level of each of the reference images being determined by illumination conditions existing when the initial train and when the later recorded frame were recorded; second means for modifying each pixel's digital amplitude level of one of a current image frame and the stored reference image then being stored to make their corresponding pixels defining stationary objects substantially equal to one another; third means responsive to the digital amplitude-level difference between corresponding pixels of each of successively occurring ones of the successive image frames and the then stored reference image for deriving successive images defining only moving objects within the field of view; fourth means for discriminating between those moving objects that remain substantially fixed in position with respect to one another in each of the successively-occurring ones of the successively-occurring images and those moving objects that substantially change in position with respect to one another in each of the successively-occurring ones of the successively-occurring images; and fifth means responsive to the variance of the digital amplitude levels of the pixels of those ones of the objects that remain substantially fixed in position with respect to one another for distinguishing and then eliminating those ones of the moving objects that remain substantially fixed in position with respect to one another that define non-physical moving objects, such as shadows and headlight reflections cast by physical moving objects, from the moving objects that remain substantially fixed in position with respect to one another that define the physical moving objects.

DESCRIPTION OF THE PREFERRED EMBODIMENTS

Figure 1A:
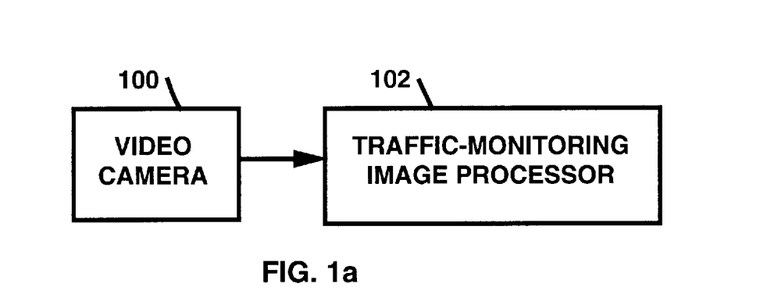
FIGS. 1*a* and 1*b* show alternative real time and non-real time ways of coupling a video camera to a traffic-monitoring image processor.
Figure 1B:
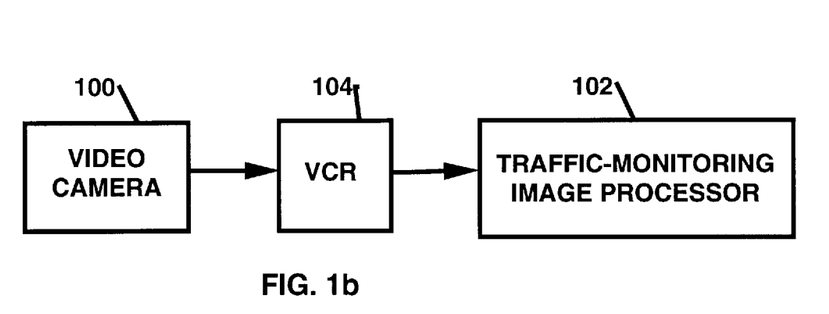

The present invention comprises at least one video camera for deriving successive image frames of road traffic and a traffic-monitoring image processor for digitally processing the pixels of the successive image frames. As shown in FIG. 1*a*, the output of video camera 100 may be directly applied as an input to traffic-monitoring image processor 102 for digitally processing the pixels of the successive image frames in real time. Alternatively, as shown in FIG. 1*b*, the output of video camera 100 may be first recorded by VCR 104 and then, at a later time, the pixels of the successive image frames may be readout of the VCR and applied as an input to traffic-monitoring image processor 102 for digitally processing the pixels of the successive image frames.

Figure 2A:
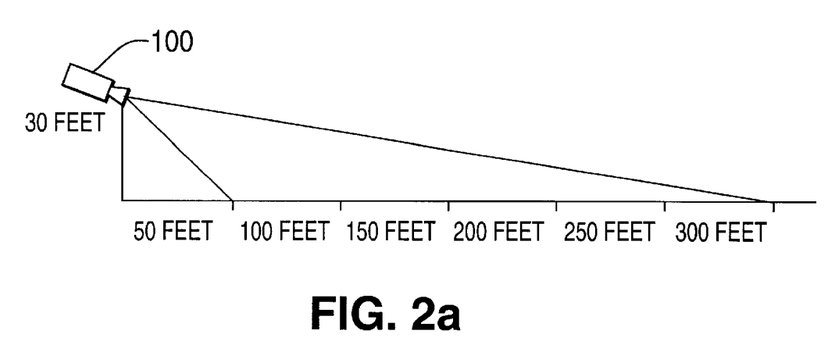
FIGS. 2*a*, 2*b* and 2*c* relate to the image field of a video camera viewing a multi-lane roadway.
Figure 2B:
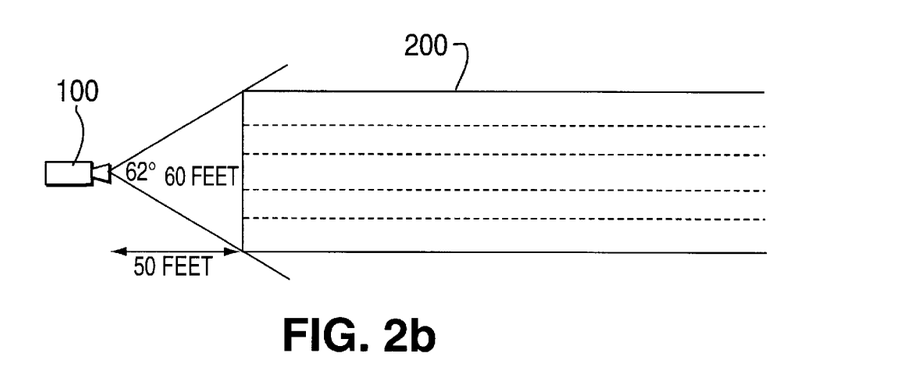
Figure 2C:
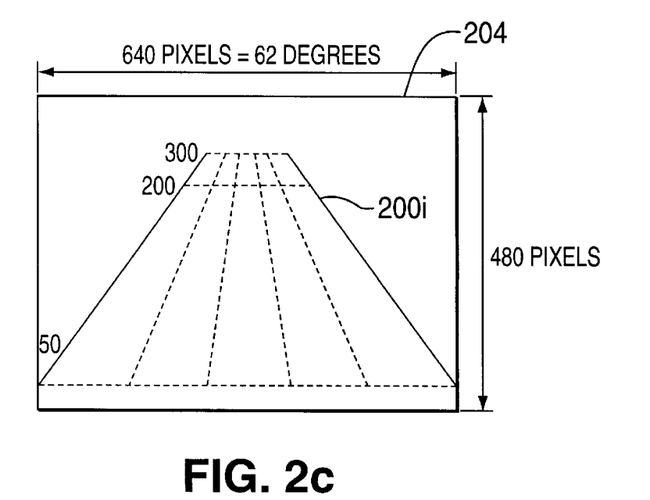

Video camera 100, which may be CCD camera or an IR camera which is mounted at a given height over a roadway and which has a given field of view of a given length segment of the roadway. As shown in FIGS. 2*a* and 2*b*, video camera 100, by way of example, may be mounted 30 feet above the roadway and have a 62° field of view sufficient to view a 60 foot width (5 lanes) of a length segment of the roadway extending from 50 feet to 300 feet with respect to the projection of the position of video camera 100 on the roadway. FIG. 2*c* shows that video camera 100 derives a 640×480 pixel image of the portion of the roadway within its field of view. For illustrative purposes, vehicular traffic normally present on the length segment of the roadway has been omitted from the FIG. 2*c* image.

In a designed vehicular traffic monitoring system, video camera 100 was one of a group of four time-divided cameras each of which operated at a frame rate of 7.5 frames per second.

A principal purpose of the present invention is to be able to provide a computationally-efficient digital traffic-monitoring image processor that is capable of more accurately detecting, counting and tracking vehicular traffic traveling over the viewed given length segment of the roadway than was heretofore possible. For instance, consider the following four factors which tend to result in detecting, and tracking errors or in decreasing computational efficiency:

1. Low Contrast

A vehicle must be detected based on its contrast relative to the background road surface. This contrast can be low when the vehicle has a reflected light intensity similar to that of the road. Detection errors are most likely under low light conditions, and on gray, overcast days. The system may then miss some vehicles, or, if the threshold criteria for detection are low, the system may mistake some background patterns, such as road markings, as vehicles.

2. Shadows and Headlight Reflections

At certain times of day vehicles will cast shadows or cause headlight reflections that may cross neighboring lanes. Such shadows or headlight reflections will often have greater contrast than the vehicles themselves. Prior art type traffic monitoring systems may then interpret shadows as additional vehicles, resulting in an over count of traffic flow. Shadows of large vehicles, such as trucks, may completely overlap smaller cars or motor cycles, and result in the overshadowed vehicles not being counted. Shadows may also be cast by objects that are not within the roadway, such as trees, building, and clouds. And they can be cast by vehicles going the other direction on another roadway. Again, such shadows may be mistaken as additional vehicles.

3. Camera Sway

A camera that is mounted on a utility pole may move as the pole sways in a wind. A camera mounted on a highway bridge may vibrate when trucks pass over the bridge. In either case camera motion results in image motion and that cause detection and tracking errors. For example, camera sway becomes a problem if it causes the detection process to confuse one road lane with another, or if it causes a stationary vehicle to appear to move.

4. Computational Efficiency

Since vehicle travel is confined to lanes and normal travel direction is one dimensional along the length of a lane, it is computationally inefficient to employ two-dimensional image processing in detecting and tracking vehicular traffic.

The present invention is directed to a digital traffic-monitoring image processor that includes means for overcoming one or more of these four problems.

Figure 3:
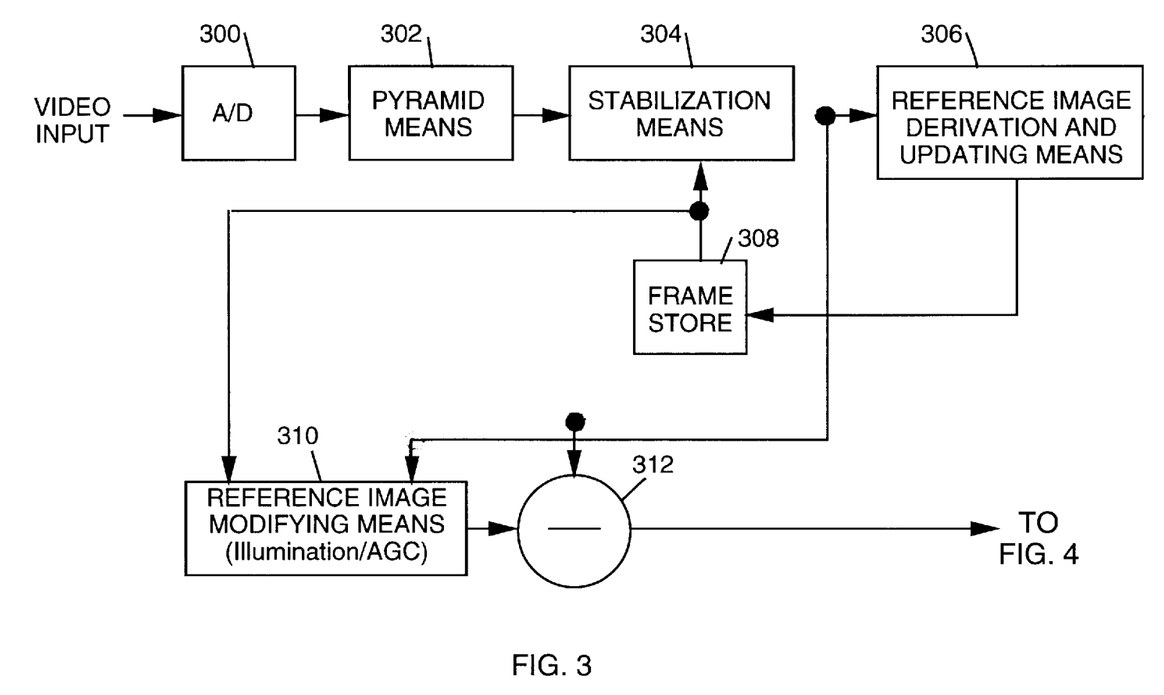
FIG. 3 is a functional block diagram of the preprocessing portion of the digital image processor of the present invention.

Referring to FIG. 3, there is shown a functional block diagram of a preferred embodiment of a preprocessor portion digital traffic-monitoring image processor 102. Shown in FIG. 3 are analog-to-digital (A/D) converter 300, pyramid means 302, stabilization means 304, reference image derivation and updating means 306, frame store 308, reference image modifying means 310 and subtractor 312.

The analog video signal input from camera 100 or VCR 104, after being digitized by A/D 300, may be decomposed into a specified number of Gaussian pyramid levels by pyramid means 302 for reducing pixel density and image resolution. Pyramid means 302 is not essential, since the vehicular traffic system could be operated at the resolution of the 640×480 pixel density of video camera 100. However, because this resolution is higher than is needed downstream for the present vehicular traffic system, the use of pyramid means 302 increases the system's computational efficiency. Not all levels of the pyramid must be used in each computation. Further, not all levels of the pyramid need be stored between computations, as higher levels can always be computed from lower ones. However, for illustrative purposes it is assumed that all of the specified number of Gaussian pyramid levels are available for each of the downstream computations discussed below.

The first of these downstream computations is performed by stabilization means 304. Stabilization means 304 employs electronic image stabilization to compensate for the problem of camera sway, in which movement may be induced by wind or a passing truck. Camera motion causes pixels in the image to move. Prior art vehicular traffic systems that do not compensate for camera motion will produce false positive detections if the camera moves so that the image of a surface marking or a car in an adjacent lane overlaps a detection zone. Stabilization means 304 compensates for image translation from frame to frame that is due to camera rotation about an axis perpendicular to the direction of gaze. The compensation is achieved by shifting the current image an integer number of rows and columns so that, despite camera sway, it remains fixed in alignment to within one pixel with a reference image derived by means 306 and stored within frame store 308. The required shift is determine by locating two known landmark features in each frame. This is done via a matched filter.

The problem of low contrast is overcome by the cooperative operation of reference image derivation and updating means 306, frame store 308 and reference image modifying means 310. Means 306 generates an original reference image $r_0$ simply by blurring the first-occurring image frame $i_0$ applied as an input thereto from means 304 with a large Gaussian filter (so that reference image $r_0$ may comprise a higher pyramid level), and then reference image $r_0$ is stored in frame store 308. Following this, the image stored in frame store 308 is updated during a first initialization phase by means 306. More specifically, means 306 performs a recursive temporal filtering operation on each corresponding pixel of the first few image frames of successive stabilized image frames applied as an input thereto from means 304 with the additional constraint that if the difference between the reference image and the current image is too large, the reference image is not updated at that pixel. Put mathematically, $$r_t(x, y) = \begin{cases} r_{t-1}(x, y) + \gamma \times [i_t(x, y) - r_{t-1}(x, y)] & \text{if } |i_t(x, y) - r_{t-1}(x, y)| < D \\ r_{t-1}(x, y) & \text{otherwise} \end{cases} \quad (1)$$

where $r_t$ represents the reference image after frame t, and $i_t$ represents the t'th frame of the input image frame sequence from means 304. The constant $\gamma$ determines the "responsiveness" of the construction process.

The "responsiveness" setting of $\gamma$ must be sufficiently slow to keep transitory objects, such as moving vehicles or even vehicles that may be temporarily stopped by a traffic jam, out of the reference image, so that, at the end of the first few input image frames to means 306 which comprise the first initialization phase, the stored reference image in frame store 308 will comprise only the stationary background objects being viewed by camera 100. Such a "responsiveness" setting of $\gamma$ is incapable of adjusting $r_t$ quickly enough to add illumination changes (such as those due to a passing cloud or the auto-iris on camera 100) to the reference image. This problem is solved at the end of the initialization phase by the cooperative updating operation of reference image modifying means 310 (which comprises an illumination/AGC compensator) with that of means 306 and frame store 308. Specifically, when the initialization phase is completed, it is replaced by a second normal operating phase which operates in accordance with the following equation 2 (rather than the above equation 1):

$$r_{t-}(x, y) = \tag{2}$$

$$\begin{cases} r_{t-1}(x, y) + \gamma x[i_t(x, y) - r_{t-1}(x, y)] & \text{if } |i_t(x, y) - r_{t-1}(x, y)| < D \\ k_t r_{t-1}(x, y) + c_t & \text{otherwise} \end{cases}$$

where $k_t$ and $c_t$ are the estimated gain and offset between the reference image $r_t$ and the current image $i_t$ computed by means 310. Means 310 computes this gain and offset by plotting a cloud of points in a 2D space in which the x-axis represents gray-level intensity in the reference image, and the y-axis represents gray-level intensity in the current image, and fitting a line to this cloud. The cloud is the set of points $(r_{t-1}(x,y), i_t(x,y))$ for all image positions x,y. This approach will work using any method for computing the gain and offset representing illumination change. For example, the gain might be estimated by comparing the histograms of the current image and the reference image. Also, the specific update rules need not use an absolute threshold D as described above. Instead, the update could be weighted by any function of $|i_t(x,y) - r_{t-1}(x,y)|$.

The above approach allows fast illumination changes to be added to the reference image while preventing transitory objects from being added. It does so by giving the cooperative means the flexibility to decide whether the new reference image pixel values should be computed as a function of pixel values in the current image or whether they should be computed simply by applying a gain and offset to the current reference image. By applying a gain and offset to the current reference image the illumination change can be simulated without running the risk of allowing transitory objects to appear in the reference image.

The result is that the amplitude of the stationary background manifesting pixels of the illumination-compensated current image appearing at the output of means 310 (which includes both stationary background manifesting pixels and moving object (i.e., vehicular traffic)) will always be substantially equal to the amplitude of the stationary background manifesting pixels of the reference image (which includes solely stationary background manifesting pixels) appearing at the output of frame store 308. Therefore, subtractor 312, which computes the difference between the amplitudes of corresponding pixels applied as inputs thereto from means 310 and 304, derives an output made up of significantly-valued pixels that manifest solely moving object (i.e., vehicular traffic) in each one of successive 2D image frames. The output of subtractor 312 is forwarded to the detection and tracking portion of traffic-monitoring image processor 102 shown in FIG. 4.

Figure 4:
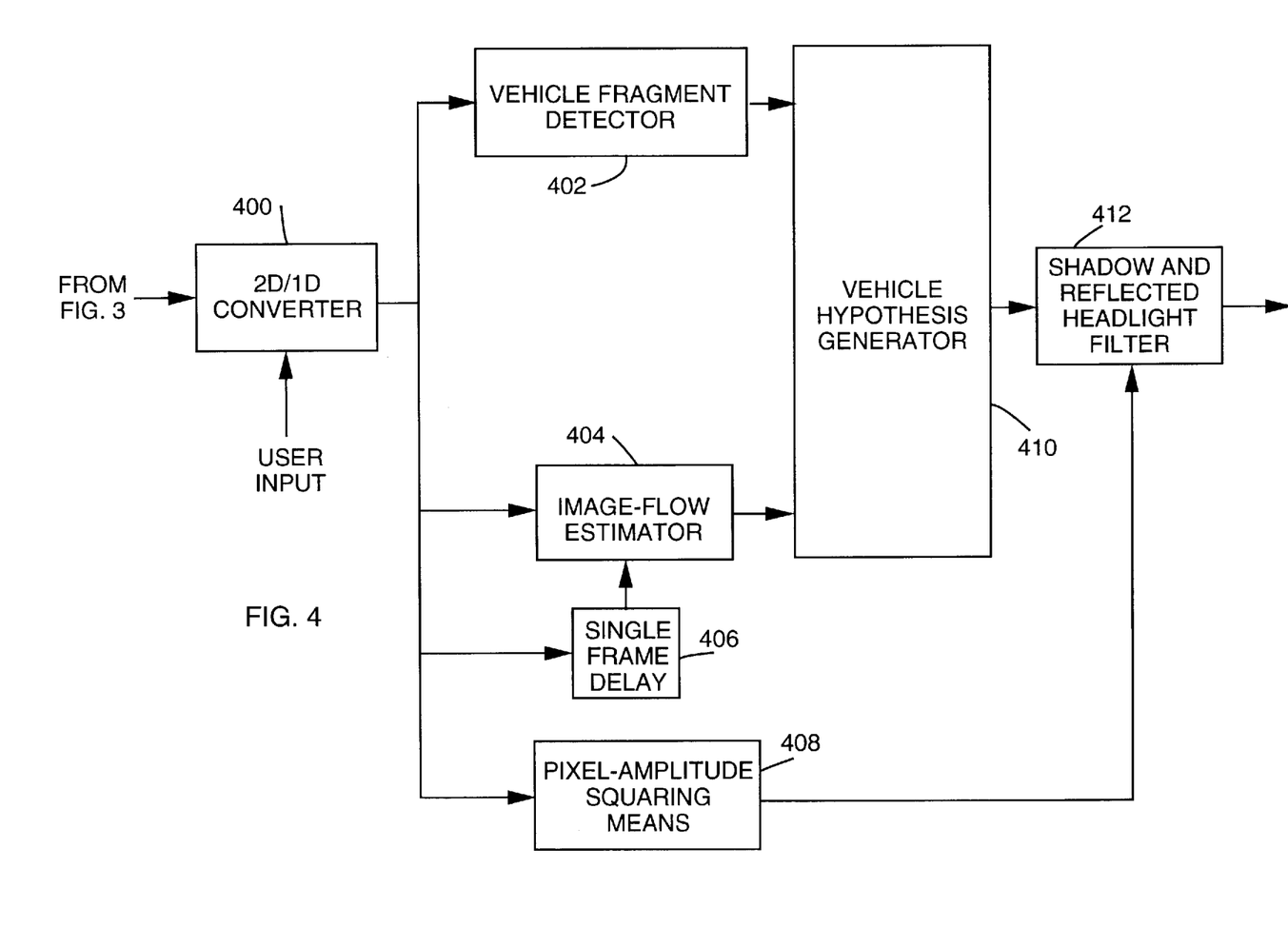
FIG. 4 is a functional block diagram of the detection and tracking portion of the digital image processor of the present invention.

Referring to FIG. 4, there is shown 2D/1D converter 400, vehicle fragment detector 402, image-flow estimator 404, single frame delay 406, pixel-amplitude squaring means 408, vehicle hypothesis generator 410 and shadow and reflected headlight filter 412.

Figure 5:
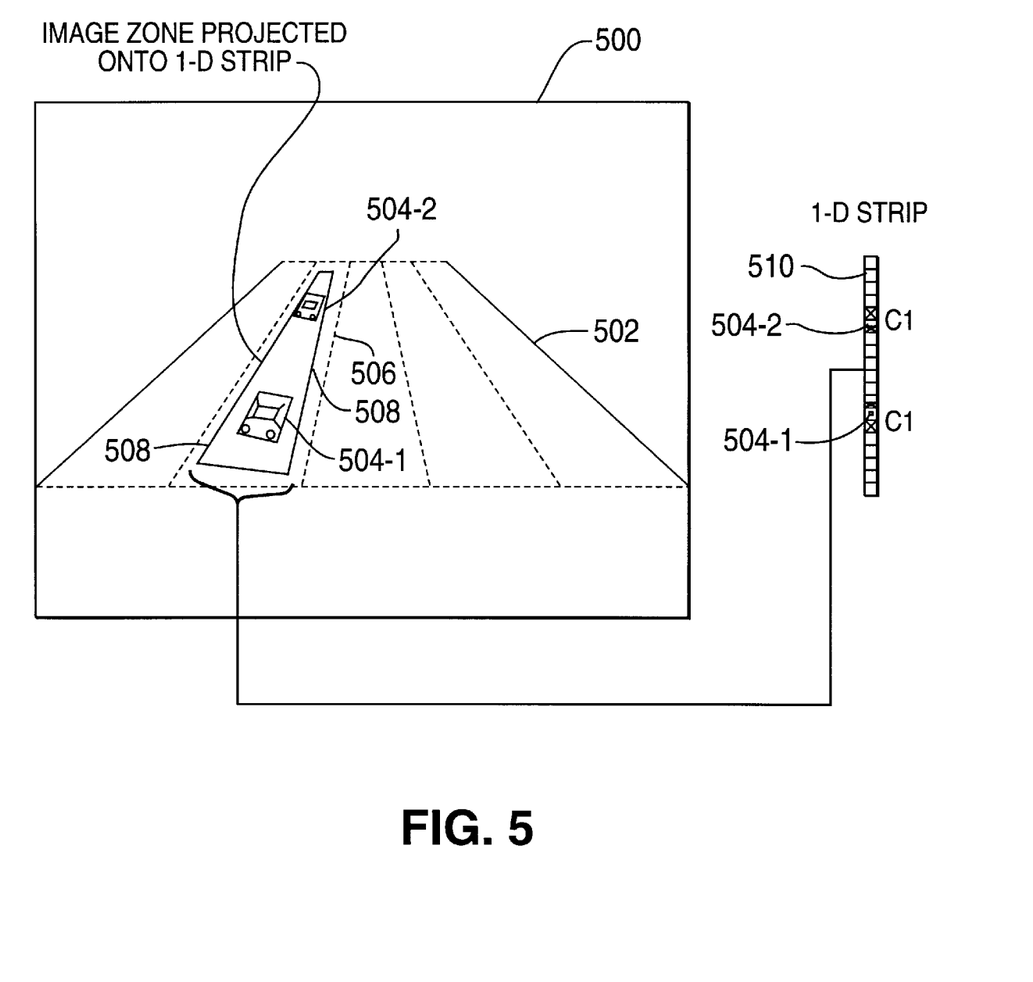
FIGS. 5 and 5*a* illustrate the manner in which image pixels of a 2D delineated zone of a roadway lane are integrated into a 1D strip.
Figure 5A:
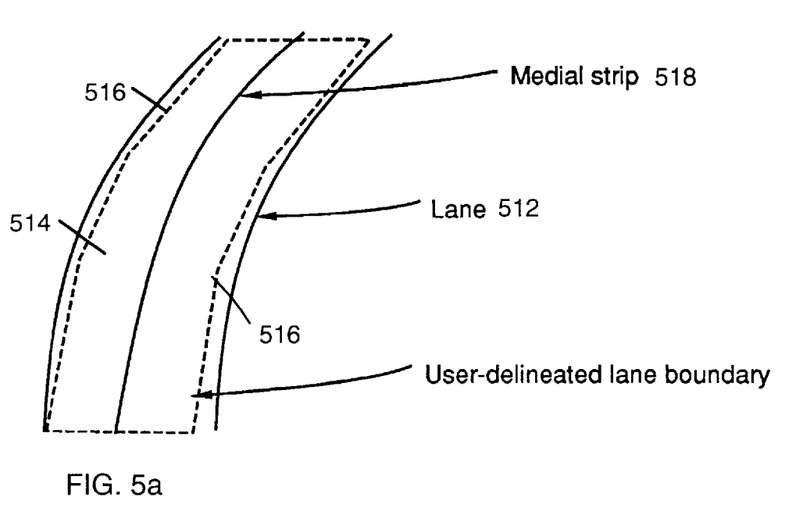

2D/1D converter 400 operates to convert 2D image information received from FIG. 3 that is applied as a first input thereto into 1D image information in accordance with user control information applied as a second input thereto. In this regard, reference is made to FIGS. 5 and 5a. FIG. 5 shows an image frame 500 derived by camera 100 of straight, 5-lane roadway 502 with cars 504-1 and 504-2 traveling on the second lane 506 from the left. Cars 504-1 and 504-2 are shown situated within an image zone 508 delineated by the aforesaid user control information applied as a second input to converter 400. By integrating horizontally the amplitudes of the pixels across image zone and then subsampling the vertically oriented integrated pixel amplitudes along the center of zone 508, 1D strip 510 is computed by converter 400. The roadway need not be straight. As shown in FIG. 5a, curved roadway lane 512 includes zone 514 defined by user-delineated lane boundaries 516 which permits the computation of medial strip 518 by converter 400. In both FIGS. 5 and 5a, the user may employ lane-defining stripes that may be present in the image as landmarks for help in defining the user-delineated lane boundaries.

More specifically, computation by converter 400 involves employing each of pixel positions (x, y) to define integration windows. For example, such a window might be either (a) all image pixels on row y that are within the delineated lane bounds, (b) all image pixels on column x that are within the delineated lane bounds, or (c) all image pixels on a line perpendicular to the tangent of the medial strip at position (x, y). Other types of integration windows not described here may also be used.

The 1D output from converter 400 is applied as an input to detector 402, estimator 404 and single frame delay 406, and through means 408 to filter 408. While the respective detection, tracking and filtering functions performed by these elements are independent of whether they operate on 1D or 2D signals, 1D operation is to be preferred because it significantly reduces computational requirements. Therefore, the presence of converter 400, while desirable, is not essential to the performance of these detection, tracking and filtering functions. In the following discussion, it is assumed that converter 400 is present Detector 402 preferably utilizes a multi-level pyramid to provide a coarse-to-fine operation to detect the presence and spatial location of vehicle fragments in the 1D strip of successive image frames received from FIG. 3. A fragment is defined as a group of significantly-valued pixels at any pyramid level that are connected to one another. Detector 402 is tuned to maximize the chances that each vehicle will give rise to a single fragment. However, in practice this is impossible to achieve; each vehicle gives rise to multiple fragments (such as separate fragments corresponding to the hood, roof and headlights of the same vehicle). Further, pixels of more than one vehicle may be connected into a single fragment.

One technique for object detection at each strip pixel position is to compute a histogram of the image intensity values within the integration window centered at that pixel position. Based on attributes of this histogram (e.g., the number or percentage of pixels over some threshold value or values), classify that strip pixel as either "detection" or "background". By performing this operation at each strip pixel, one can construct a one-dimensional array that contains, for each pixel position, the "detection" or "background" label. By performing connected component analysis within this array, adjacent "detection" pixels can be grouped into "fragments".

Image-flow estimator 404 in cooperation with delay 406, which employs the teachings of the aforesaid Bergen et al. article, to permit objects to be tracked over time. Briefly, in this case, this involves, at each pixel position, computing and storing the average value contained within the integration window. By performing this operation at each strip pixel, a one-dimensional array of average brightness values is constructed. Given two corresponding arrays for images taken at times t−1 and t, the one-dimensional image "flow" that maps pixels in one array to the other is computed. This can be computed via one-dimensional least-squares minimization or one-dimensional patchwise correlation. This flow information can be used to track objects between each pair of successive image frames.

The respective outputs of detector 402 and estimator 404 are applied as inputs to vehicle hypothesis generator 410.

Nearby fragments are grouped together as part of the same object (i.e., vehicle) if they move in similar ways or are sufficiently close together. If the positions of multiple fragments remain substantially fixed with respect to one another in each of a train of successive frames, they are assumed to indicate only a single vehicle. However, if the positions of the fragments change from frame to frame, they are assumed to indicate separate vehicles. Further, if a single fragment of in one frame breaks up into multiple fragments or significantly stretches out longitudinally in shape from one frame to another, they are also assumed to indicate separate vehicles.

At night, the presence of a vehicle may be indicated only by its headlights. Headlights tend to produce headlight reflections on the road.

Lighting conditions on the road during both day and night tend to cause vehicle shadows on the road. Both such shadows and headlight reflections on the road result in producing detected fragments that will appear to generator 410 as additional vehicles, thereby creating false positive error in the output from generator 410. Shadow and reflected headlight filter 412, which discriminates between fragments that produced by valid vehicles and those produced by shadows and reflected headlights, eliminates such false positive error.

The output from pixel-amplitude squaring means 408 manifests the relative energy in each pyramid-level pixel of the strip output of each of successive image frames from converter 400. Filter 412 discriminates between fragments that produced by valid vehicles and those produced by shadows and reflected headlights based on an analysis of the relative amplitudes of these energy-manifesting pixels from means 408. The fact that the variance in energy pixel amplitude (pixel brightness) of shadow and reflected headlight fragments is significantly less than that of valid vehicle fragments can be used as a discriminant.

Another way of filtering, not shown in FIG. 4, is to employ converter 400 for discriminating between objects and shadows using the background-adjusted reference image. At each pixel position, the following information is computed over the integration window:

(a) the number of pixels with brightness value greater than some threshold p, over all image pixels within the integration window (b) the maximum absolute value, over all image pixels within the integration window (c) the number of adjacent pixels $(x_1, y_1,$ and $(x_2, y_2)$ within the integration window whose absolute difference, $|I(x_1, y_1)-I(x_2, y_2)|$, exceeded a threshold value.

Fragments that have been extracted as described previously can be classified as object or shadow based on these or other properties. For example, if the value of measure (a), summed over all strip pixels within the fragment, exceeds some threshold, then the fragment cannot be a shadow (since shadows would never have positive brightness values in the images applied to converter 400 from FIG. 3. A similar summation using measure (c) provides another test measuring the amount of texture within the fragment, which can also be thresholded to determine whether a fragment is an object or a shadow. While the input to filter 412 defines all hypothesized vehicle locations, the output therefrom defines only verified vehicle locations. The output from filter 412 is forwarded to utilization means (not shown) which may perform such functions as counting the number of vehicles and computing their velocity and length.

Vehicle fragment detector 402, image-flow eatimator 404, and vehicle hypothesis generator 410 may use pre-determined camera calibration information in their operation. Further, each of the various techniques of the present invention described above may also be employed to advantage in other types of imaging systems from the vehicular traffic monitoring system disclosed herein.

We claim:

1. In a vehicular traffic monitoring system including a video camera having a given field of view for recording successive image frames of road traffic within its field of view, and digital image processing means responsive to pixel information defined by each of said successive image frames; the improvement wherein said digital image processing means comprises:

first means responsive to an initial train of said successive image frames for deriving a stored initial reference image defining only stationary objects within said field of view and thereafter updating said stored initial reference image with a reference image derived from an image frame recorded later than said initial train, with each pixel's digital amplitude level of each of said reference images being determined by illumination conditions existing when said initial train and when said later recorded frame were recorded;

second means for modifying each pixel's digital amplitude level of one of a current image frame and said stored reference image then being stored to make their corresponding pixels defining stationary objects substantially equal to one another;

third means responsive to the digital amplitude-level difference between corresponding pixels of each of successively-occurring ones of said successive image frames and the then stored reference image for deriving successive images defining only moving objects within said field of view;

fourth means for discriminating between those moving objects that remain substantially fixed in position with respect to one another in each of said successively-occurring ones of said successively-occurring images and those moving objects that substantially change in position with respect to one another in each of said successively-occurring ones of said successively-occurring images; and a fifth means responsive to the variance of the digital amplitude levels of the pixels of those ones of said objects that remain substantially fixed in position with respect to one another for distinguishing those ones of said moving objects that remain substantially fixed in position with respect to one another that define non-physical moving objects, from said moving objects that remain substantially fixed in position with respect to one another that define physical moving objects, and then eliminating those ones of said moving objects that define non-physical moving objects.

2. The vehicular traffic monitoring system defined in claim 1, wherein said video camera is subject to camera sway, and wherein said digital image processing means further comprises:

electronic image stabilization means for compensating for image translation due to camera sway.

3. The vehicular traffic monitoring system defined in claim 2, wherein:

said electronic image stabilization means employs two known landmarks in each successive image frame to shift the current image that first number of rows and that second number of columns which result in said current image remaining substantially in alignment with said reference image.

4. The vehicular traffic monitoring system defined in claim 1, wherein said video camera records successive two-dimensional image frames of road traffic within its field of view, and wherein said digital image processing means further comprises:

sixth means employing pixel integration windows for converting each frame derived by said third means of said successive images that define only moving objects within said field of view from a two-dimensional image frame to a one-dimensional image frame that is substantially oriented in the direction of said road traffic.

5. The vehicular traffic monitoring system defined in claim 1, wherein:

said first means and said second means cooperate during the occurrence of said initial train of said successive image frames in accordance with a first set of equations $$r_{t-}(x, y) = \begin{cases} r_{t-1}(x, y) + \gamma x[i_t(x, y) - r_{t-1}(x, y)] & \text{if } |i_t(x, y) - r_{t-1}(x, y)| < D \\ r_{t-1}(x, y) & \text{otherwise} \end{cases}$$

and thereafter said first and second means cooperate in accordance with a second set of equations $$r_{t-}(x, y) = \begin{cases} r_{t-1}(x, y) + \gamma x[i_t(x, y) - r_{t-1}(x, y)] & \text{if } |i_t(x, y) - r_{t-1}(x, y)| < D \\ k_t r_{t-1}(x, y) + c_t & \text{otherwise} \end{cases}$$

where (x,y) represents the coordinates of each pixel in an image frame, $r_t$ represents the reference image after frame t, and $i_t$ represents the t'th frame of the successive image frames, D represents a predetermined difference between the amplitude level of each pair of corresponding pixels of $i_t$ and $r_t$, k and $c_t$ respectively represent a single pair of estimated gain and offset values in amplitude level for the pixels of one of $i_t$ and $r_t$ which results in corresponding pixels of $i_t$ and $r_t$ which reduces the statistical error in the respective differences in amplitude levels between corresponding pixels of $i_t$ and $r_t$, and $\gamma$ is a constant that determines the responsiveness of the cooperation of said first and second means both during the occurrence of said initial train of said successive image frames and thereafter.

6. The vehicular traffic monitoring system defined in claim 5, wherein: k and $c_t$ respectively represent that single pair of estimated gain and offset in amplitude level of the pixels of one of $i_t$ and $r_t$ which minimizes the statistical error in the respective differences in amplitude levels between corresponding pixels of $i_t$ and $r_t$.

7. A method of image processing comprising the steps of:

(a) supplying a first sequence of image frames;

(b) initializing a reference image that contains image information regarding stationary objects within a scene represented by said first sequence of images;

(c) supplying a next image frame which temporally follows said first sequence of image frames;

(d) comparing said next image frame to said reference image to produce a two-dimensional motion image representing motion information regarding movement of objects within the scene;

(e) updating said reference image with information within said next image frame, where said information used for updating the reference image only represents stationary objects within the scene and substantially disregards moving objects and temporarily stationary objects within the scene; and (f) repeating steps (c), (d), and (e) for each next image supplied.

8. The method of claim 7 further comprising the step of stabilizing each image frame to remove any motion within said image frames that occurs due to imaging sensor movement rather than object movement within the scene.

9. The method of claim 7 wherein said updating step comprises the steps of:

selecting a pixel value in the reference image and a pixel value in the next image frame having the same pixel location as the selected pixel value in the reference image;

computing a difference factor equal to the absolute value of the difference between said selected pixel value in the next image frame and said pixel value in the reference image;

comparing the difference value to a first threshold value;

if said difference value is less than said first threshold value, replacing the pixel value in the reference image with an updated reference pixel value equaling the selected reference image pixel value altered by an update factor; and if said difference value is greater than or equal to said first threshold value, the pixel value in said reference image remains the same.

10. The method of claim 9 wherein said update factor is the difference between said selected pixel value in the next image and said pixel value in the reference image multiplied by a responsiveness factor, where said responsiveness factor limits the amount of the update to ensure that the updated reference image only contains information regarding information within said next image frame that represents stationary objects within the scene.

11. The method of claim 9 wherein said first threshold value is a function of the difference factor.

12. The method of claim 7 wherein said method further comprises the step of modifying said reference image using image information within said next image frame regarding changes to illumination of the scene.

13. The method of claim 12 wherein said modifying step comprises the steps of:

selecting a pixel value in the reference image and a pixel value in the next image frame having the same pixel location as the selected reference image pixel value;

computing a difference factor equal to the absolute value of the difference between said selected pixel value in the next image and said pixel value in the reference image;

comparing the difference value to a second threshold value;

if said difference value is less than said second threshold value, replacing the pixel value in the reference image with a modified reference pixel value equaling the selected reference image pixel value altered by a modifying factor; and if said difference value is greater than or equal to said second threshold value, the selected reference image pixel value is replaced with a new reference image pixel value equal to a weighted and scaled selected reference image pixel value.

14. The method of claim 13 wherein said modifying factor is the difference between said selected pixel value in the next image frame and said selected pixel value in the reference image multiplied by a responsiveness factor, where said responsiveness factor limits the amount of the modification to ensure that the modified reference image only contains information regarding information within said next image frame that represents stationary objects within the scene and where said weighted and scaled selected reference image pixel value represents illumination changes within said scene.

15. The method of claim 13 wherein said second threshold value is a function of the difference factor.

16. The method of claim 7 further comprising the step of converting the two-dimensional motion image into a one-dimensional data set.

17. The method of claim 16 wherein the converting step further comprises the steps of:
   defining a zone within said two-dimensional motion image containing a plurality of rows of pixel values;
   integrating the pixel values across each said row of pixel values within said zone to produce an integrated pixel value for each of said rows of pixel values; and
   subsampling said integrated pixel values to produce said one-dimensional data set.

18. The method of claim 17 further comprising the steps of:
   detecting object fragments within said one dimensional data set, where said object fragments are a group of significantly-valued integrated pixel values that are adjacent one another;
   estimating object motion of said object fragments between two consecutive next image frames; and
   identifying objects within the zone in response to the estimated object motion of said object fragments.

19. The method of claim 18 further comprising the step of filtering said identified objects to eliminate erroneous moving object identifications.

20. The method of claim 19 wherein said filtering step comprises:
   identifying the pixels within the zone having a brightness value greater than a brightness threshold as bright pixels;
   computing a maximum absolute value of the pixel values within the zone;
   identifying the adjacent pixels within the zone having an absolute difference of pixel values that exceeds an absolute difference threshold as intense valued pixels;
   using the bright pixels, the maximum absolute value and the intense values pixels to eliminate moving object identifications that represent movement of non-physical objects within the zone.

21. The method of claim 7 further comprising the steps of:
   detecting object fragments within said two-dimensional motion image, where said object fragments are a group of significantly-valued integrated pixel values that are adjacent one another;
   estimating object motion of said object fragments between two consecutive next image frames; and
   identifying objects within the scene in response to the estimated object motion of said object fragments.

22. The method of claim 21 further comprising the step of filtering said identified objects to accurately identify physical moving objects and eliminate non-physical moving object identifications.

23. The method of claim 22 wherein said filtering step comprises:
   identifying the pixels within the two-dimensional motion image having a brightness value greater than a brightness threshold as bright pixels;
   computing a maximum absolute value of the pixel values within the two-dimensional motion image;
   identifying the adjacent pixels within the two-dimensional motion image having an absolute difference of pixel values that exceeds an absolute difference threshold as intense valued pixels;
   using the bright pixels, the maximum absolute value and the intense valued pixels to eliminate non-physical moving objects from the identified moving objects.

24. Apparatus for image processing comprising:
   imaging means for supplying a continuous sequence of image frames representing a scene;
   reference image initializing means, connected to said imaging means, for initializing a reference image that contains image information regarding stationary objects within the scene;
   comparator means, connected to said imaging means and said reference image initializing means, for comparing an image frame supplied by said imaging means to said reference image to produce a two-dimensional motion image representing motion information regarding movement of objects within the scene;
   means for updating said reference image with information within said image frame, where said information used for updating the reference image only represents stationary objects within the scene and substantially disregards moving objects and temporarily stationary objects within the scene.

25. The apparatus of claim 24 further comprising stabilization means, connected to said imaging means, for stabilizing each image frame to remove any motion within said image frames that occurs due to imaging means movement rather than object movement within the scene.

26. The apparatus of claim 24 wherein said updating means comprises:
   means for selecting a pixel value in the reference image and a pixel value in the next image frame having the same pixel location as the selected pixel value in the reference image;
   means for computing a difference factor equal to the absolute value of the difference between said selected pixel value in the next image frame and said pixel value in the reference image;
   means for comparing the difference value to a first threshold value; and
   means for replacing reference image pixel, where if said difference value is less than said first threshold value, the pixel value in the reference image is replaced with an updated reference pixel value equaling the selected reference image pixel value altered by an update factor, and if said difference value is greater than or equal to said first threshold value, the pixel value in said reference image remains the same.

27. The apparatus of claim 26 wherein said update factor is the difference between said selected pixel value in the next image and said pixel value in the reference image multiplied by a responsiveness factor, where said responsiveness factor limits the amount of the update to ensure that the updated reference image only contains information regarding information within said image frame that represents stationary objects within the scene.

28. The apparatus of claim 26 wherein said first threshold value is a function of the difference factor.

29. The apparatus of claim 24 further comprising means for modifying said reference image using image information within said image frame regarding changes to illumination of the scene.

30. The apparatus of claim 29 wherein said modifying means comprises:

means for selecting a pixel value in the reference image and a pixel value in the image frame having the same pixel location as the selected reference image pixel value;

means for computing a difference factor equal to the absolute value of the difference between said selected pixel value in the next image and said pixel value in the reference image;

means for comparing the difference value to a second threshold value; and means for replacing the selected reference image pixel, where if said difference value is less than said second threshold value, the pixel value in the reference image is replaced with a modified reference pixel value equaling the selected reference image pixel value altered by a modifying factor, and if said difference value is greater than or equal to said second threshold value, the selected reference image pixel value is replaced with a new reference image pixel value equal to a weighted and scaled selected reference image pixel value.

31. The apparatus of claim 30 wherein said modifying factor is the difference between said selected pixel value in the image frame and said selected pixel value in the reference image multiplied by a responsiveness factor, where said responsiveness factor limits the amount of the modification to ensure that the modified reference image only contains information regarding information within said next image frame that represents stationary objects within the scene and where said weighted and scaled selected reference image pixel value represents illumination changes within said scene.

32. The apparatus of claim 30 wherein said second threshold value is a function of the difference factor.

33. The apparatus of claim 24 further comprising means, connected to said comparator means, for converting the two-dimensional motion image into a one-dimensional data set.

34. The apparatus of claim 33 wherein the converting means further comprises:

means for defining a zone within said two-dimensional motion image containing a plurality of rows of pixel values;

means for integrating the pixel values across each said row of pixel values within said zone to produce an integrated pixel value for each of said rows of pixel values; and means for subsampling said integrated pixel values to produce said one-dimensional data set.

35. The apparatus of claim 34 further comprising:

means for detecting object fragments within said one dimensional data set, where said object fragments are a group of significantly-valued integrated pixel values that are adjacent one another;

means for estimating object motion of said object fragments between two consecutive next image frames; and means for identifying objects within the zone in response to the estimated object motion of said object fragments.

36. The apparatus of claim 35 further comprising filter means for filtering said identified objects to eliminate erroneous moving object identifications.

37. The apparatus of claim 36 wherein said filter means comprises:

means for identifying the pixels within the zone having a brightness value greater than a brightness threshold as bright pixels;

means for computing a maximum absolute value of the pixel values within the zone;

means for identifying the adjacent pixels within the zone having an absolute difference of pixel values that exceeds an absolute difference threshold as intense valued pixels;

means for using the bright pixels, the maximum absolute value and the intense values pixels to eliminate moving object identifications that represent movement of non-physical objects within the zone.

38. The apparatus of claim 24 further comprising:

means for detecting object fragments within said two-dimensional motion image, where said object fragments are a group of significantly-valued integrated pixel values that are adjacent one another;

means for estimating object motion of said object fragments between two consecutive next image frames; and means for identifying objects within the scene in response to the estimated object motion of said object fragments.

39. The apparatus of claim 38 further comprising filter means for filtering said identified objects to accurately identify physical moving objects and eliminate non-physical moving object identifications.

40. The apparatus of claim 39 wherein said filter means comprises:

means for identifying the pixels within the two-dimensional motion image having a brightness value greater than a brightness threshold as bright pixels;

means for computing a maximum absolute value of the pixel values within the two-dimensional motion image;

means for identifying the adjacent pixels within the two-dimensional motion image having an absolute difference of pixel values that exceeds an absolute difference threshold as intense valued pixels; and means for using the bright pixels, the maximum absolute value and the intense valued pixels to eliminate non-physical moving objects from the identified moving objects.

* * * * *